Patented July 17, 1951

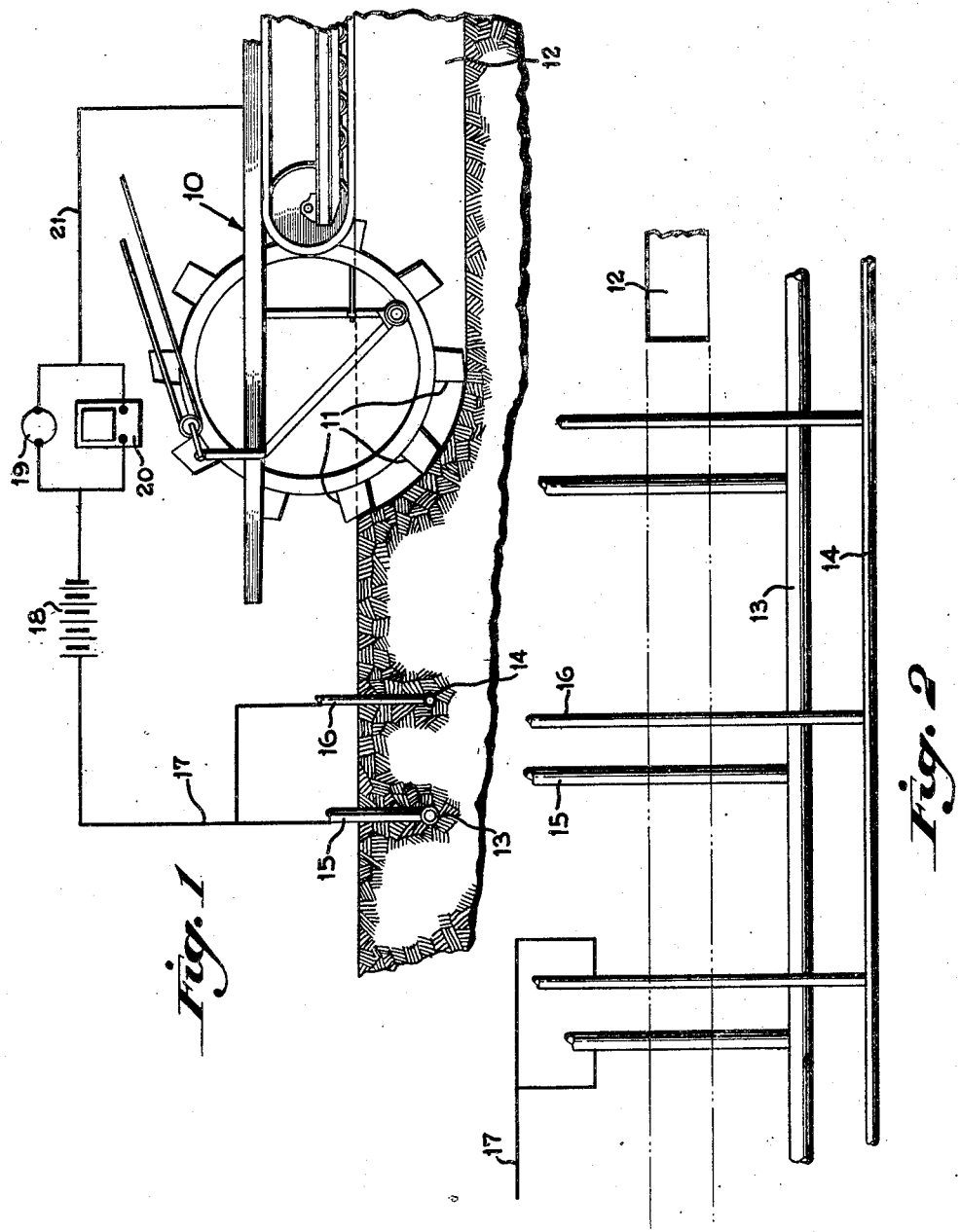

2,561,152

UNITED STATES PATENT OFFICE 2,561,152

DITCH DIGGING MACHINE WITH WARNING DEVICE

Albert R. Stryker, Lawrenceburg, Ind.

Application May 20, 1947, Serial No. 749,291

1 Claim. (Cl. 177—311)

This invention relates to ditch digging and is particularly directed to a ditch digging machine which includes an electrically operated warning device which may be a blinking light, a bell or a buzzer. The improvement is designed to warn the operator of the presence of metal pipes or conduits which lie in the path of the machine and which may be encountered. More specifically, the invention includes an arrangement whereby the warning device, as included in the ditch digging machine, is placed in circuit with the metal pipe or conduits in the immediate area of the digging operation. The ditch digging machine to which this improvement is directed is of the type utilized for digging trenches in which pipes or conduits are laid.

Obviously, in any ditch digging operation the digging machine is apt to encounter underground piping of the type used to supply gas and water to buildings or the piping of any underground system. In the use of these digging machines it is vital that the operator know of the location of all existing pipe lines in the particular area which may cross the line of the proposed trench. However, it is extremely difficult for the operator to be aware of the location of the existing pipe. Normally the location of these existing lines can only be known from a study of the various city maps, plots and layouts. Such information after a period of years becomes extremely inaccurate and certainly inadequate for the determination of precise piping locations and moreover frequently is not at all available.

It has therefore been the object of the present inventor to provide, in combination with a ditch digging machine, a warning device and a circuit which are of extremely simple mechanical and electrical construction and low cost. Further, it has been the object to provide such an apparatus which can be conveniently installed and operated in conjunction with a ditch digging machine and which will serve to warn the operator that the shovels or buckets of the machine are about to encounter underground piping.

Another object has been to provide a warning device which will be actuated and will give further warning when the shovels or buckets of the machine actually make contact with the pipe in the path of the machine.

In the development of this invention the inventor has observed that, inherently gas and water mains are laid out in connecting systems so that all the gas or water pipes in a particular area are interconnected, that is are a part of one system and that, therefore, an electrical connection to any one pipe will make a circuit through all the piping in the area depending upon the strength of the current in the electrical circuit.

Briefly, therefore, in the accomplishment of these objects the concept of the present inventor is a structure which utilizes the fact that these underground piping systems are in continuous connection and that electrical connection to any pipe in the immediate area of the ditch digging operation will warn of all pipes in that system in the immediate area. The warning device may consist simply of a battery, one terminal of which is connected with a light and a bell or buzzer which, in turn, are grounded to the frame of the ditch digging machine. As set out above, the other side of the battery may be connected to any pipe in the immediate vicinity. Therefore, if the shovels of the machine approach or contact any pipe in the system, the electric circuit is completed through the light and the buzzer causing these warning devices to light up or issue a warning sound. Thus, it is apparent that the machine operator will be warned by either observing the light or by hearing the bell or buzzer and the machine can be quickly stopped in time to avoid digging up pipe in the path of the digger.

Other objects and certain advantages will be more fully apparent from a description of the drawings in which:

Figure 1 is a diagrammatic view of a ditch digging machine showing it in the process of digging a ditch and illustrating the warning device and the circuit diagrammatically and in connection with pipes of underground systems.

Figure 2 is a diagrammatic plan view illustrating systems of piping lying in the path of the ditch digging machine and exemplifying a condition which may be encountered by the ditch digging machine.

Referring generally to the drawings which disclose the preferred embodiment of the invention, the ditch digging machine is indicated generally at 10 and the digging buckets or shovels at 11. The trench being excavated is indicated at 12.

Referring specifically to Figure 2, two systems are indicated, one of which, indicated at 13, may be the gas system and the other of which, indicated at 14, may be the water system. As is conventional, lines 15 and 16 respectively lead from these main lines to the houses along the street. A lead 17 of the electric circuit may be attached to a pipe in each of the systems. That is to say a single lead will suffice. This lead extends from the battery 18 which is carried by the ditch digging machine. The battery in turn is connected to a light 19 and a warning bell or buzzer 20. The light and buzzer are connected in parallel. A lead 21 connects these warning devices to the body of the ditch digging machine (Figure 1). The lead 17 which is connected to the pipe systems may incorporate a conveniently attached clip or a like device which can be quickly hooked to a water service or any projection of the system which is disposed above ground.

When the ditch digging buckets or scoops approach within a few inches of any one of the underground pipes in the system, the current flowing in the pipe will be carried by the ground to the metal buckets, thus completing the warning circuit. The amount of current which will flow through the ground from a battery of the type utilized will be very small and for this reason the light in the circuit must be extremely sensitive so that it will light up immediately when the ditch digging buckets are close to the pipe, in other words just before the buckets might encounter the pipe. Because of the structure of the average ditch digging machine, the light will flash intermittently since a single bucket will not be close enough constantly to complete the circuit.

If the light should fail to warn the operator, the warning bell or buzzer will emit an audible warning signal when a bucket actually contacts the pipe. Therefore, it will be evident that the combined action of the two will be enough to warn the operator of the immediate presence of underground pipe.

It will readily be appreciated that the present inventor has greatly improved the art by the provision of a relatively simple apparatus and circuit since, by its use, he has solved the problem stated heretofore. A great deal of trouble and inconvenience has been eliminated and a saving in money and labor has resulted.

In any city government over a period of years the maps and plans illustrating the locations of pipe lines become obsolete and thus are inadequate and inaccurate or, they become lost. This is particularly so in the older cities and those which have become quite congested. In any operation where it is necessary to dig trenches for the laying of additional pipe lines, it has too often been found that the expense is greatly increased because the locations of the underground pipe systems are practically unknown and in most operations a great many pipes are cut and a great deal of disruption in service has resulted.

Having described my invention, I claim:

In a ditch digging machine, a rotary digger having a series of buckets, an electrical battery mounted on said digging machine, a lead connecting one terminal of said battery to said rotary digger, an electrically responsive warning device interposed in said lead, a lead from the opposite terminal of said battery, said lead connected to a utility line whereby the circuit is completed through the ground intervening between the utility line and the buckets of said rotary digger to cause said warning device to operate intermittently due to the intermittent operation of the buckets of said rotary digger relative to the ground, said warning device including a bell and a lamp connected in parallel, the lamp being responsive to currents of smaller value than the bell, whereby said lamp glows intermittently at increasing intensity as said machine approaches the utility line, the said bell having an electrical power unit which is constructed and arranged to respond only to a direct metallic circuit with the electrical battery whereby said bell rings when one of said buckets contacts the utility line.

ALBERT R. STRYKER.

REFERENCES CITED

The following references are of record in the file of this patent:

UNITED STATES PATENTS

| Number | Name | Date |
| --- | --- | --- |
| 1,850,412 | Pavlik | Mar. 22, 1932 |
| 2,131,291 | Maust | Sept. 27, 1938 |